United States Patent Office 2,864,845
Patented Dec. 16, 1958

2,864,845

CARBON FUNCTIONAL ORGANO-SILICON PHOSPHONATES

Paul M. Kerschner, Pennsauken, and Bertrand W. Greenwald, Haddonfield, N. J., assignors to Cities Service Research and Development Company, New York, N. Y., a corporation of New Jersey No Drawing. Application July 26, 1957
Serial No. 674,306

6 Claims. (Cl. 260—448.2)

This invention relates to silicon phosphonates and more particularly to carbon functional organo-silicon phosphonates which are useful as hydraulic fluids and as lubricants.

In its broadest aspect this invention relates to new silicon phosphonates prepared by reacting one mol of a benzene phosphorous dihalide with two mols of a hydroxyalkyl silane. The new compounds resulting from the foregoing reaction are characterized by comparatively high viscosity indices, high specific gravity, low pour point, and high flash point. These new compounds are also relatively stable to oxidation and temperature variations making them suitable as lubricants and hydraulic fluids or as additives for the same.

The new and improved compounds of the present invention may be identified by the following general structure:

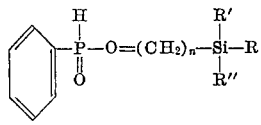

wherein $n$ is an integer from 3 to 8 and R, R', and R" are alkyl groups similar or dissimilar of branched or straight chain configuration, having from 1 to 6 carbon atoms.

The new compounds of this invention identified by the structure above are generally characterized by a light yellow color, soluble in oil and insoluble in water.

These new phosphonates are prepared by reacting one mol of a benzene phosphorous dihalide with 2 mols of a hydroxyalkyl silane, preferably in the presence of pyridine or a similar compound. The pyridine is used to take up the free HCl produced during the reaction of the phosphorous dihalide and the silane. For this purpose other similar compounds will serve equally as well particularly the amines such as for example, diethylamine and triethylamine.

The reactants are placed in a suitable flask, provided with a nitrogen inlet tube, a condenser, thermometer, and an acid trap. Upon contact of the reactant materials, a vigorous reaction will take place, with an immediate rise in temperature and the formation of a solid precipitate. The temperature is allowed to drop, with heat thereafter being applied for a period of about 4 hours, during which time the temperature of the reactant mixture is maintained at about 70–90° C. During this time a blanket of nitrogen is maintained over the reactant mixture. Precipitated pyridine hydrochloride is filtered off with the excess pyridine being removed by distillation. The crude residue obtained is then distilled at subatmospheric pressure with the final product being redistilled, if necessary, to provide a product of required purity. A more complete description of the foregoing reaction may be found in the work of G. M. Kosolapoff Organophosphorus Compounds, John Wiley (1950) at page 139.

The examples which follow illustrate the manner in which these new compounds may be prepared. It is to be understood that these examples are illustrative only and are not to be construed as limiting the invention in any manner.

Example 1

To 17.9 g. (.1 mol) of benzene phosphorous dichloride, 29.2 g. (.2 mol) of 4-hydroxybutyl, 1-trimethylsilane is added in the presence of 24.0 g. pyridine. A vigorous reaction follows with the temperature rising to 110° C. with a solid precipitate being formed. The temperature was allowed to drop to 85° and thereafter maintained at 75–85° C. by heating for 4 hours. During this time a nitrogen blanket was maintained over the reactant mixture. At the end of the 4 hour heating period, precipitated pyridine hydrochloride was filtered off and the excess pyridine removed by distillation.

The crude residue was distilled at about 1 mm. of mercury with a fraction being collected (22 g.) boiling from 130–156° C. This product was redistilled with a cut amounting to (15 g.) boiling from 142–148° C. being recovered. The product, benzene 4-trimethylsilyl-butyl-1-desoxyphosphonate, had the following properties:

| | | |
|---|---|---|
| Molecular weight | | 262 |
| Percent Si | | 10.4 |
| Percent P | | 10.1 |
| Vis. at 100° F | c. s. | 7.10 |
| Vis. at 210° F | c. s. | 2.00 |
| Vis. at —40° F | c. s. | 22.578 |
| Vis. index | | 71 |
| Vis.-temp. coefficient | | 0.719 |
| Flash point | ° F. | 295 |
| Fire point | ° F. | 470 |
| Pour point | ° F. | —70 |

Example 2

Following the procedure set forth in Example 1 above, benzene 3-trimethyl-1-silylpropyl-1, desoxyphosphonate is prepared by reacting 17.9 g. (.1 mol) of benzene phosphorous dichloride with 26.4 g. (0.2 mol) of 3-hydroxypropyl-1, trimethylsilane in the presence of 24.0 g. of pyridine.

Example 3

According to the method of Example 1, 17.9 g. (0.1 mol) of benzene phosphorous dichloride is reacted with 32.0 g. (0.2 mol) of 4-hydroxybutyl-1, ethyldimethylsilane in the presence of 24.0 g. pyridine. The product recovered is benzene 4-ethyl, 4,4 dimethyl, silylbutyl-1, desoxyphosphonate.

Example 4

Benzene 3-ethyl, 3,3-dimethyl, silylpropyl-1, desoxyphosphonate is prepared according to the method of Example 1 by reacting 17.9 g. (0.1 mol) of benzene phosphorous dichloride with 29.2 g. (0.2 mol) of 3-hydroxypropyl-1, ethyldimethylsilane in the presence of 24.0 g. of pyridine.

Example 5

To 17.9 g. (0.1 mol) of benzene phosphorous dichloride is added with 34.8 g. (0.2 mol) 6-hydroxyhexyl-1, trimethylsilane in the presence of 24.0 g. of pyridine. The reaction is carried out according to the method described in Example 1 with a final product identified as benzene 6-trimethyl, silylhexyl-1, desoxyphosphonate being recovered.

As previously indicated, the new compounds of this invention find application in a variety of uses, in particular as hydraulic fluids, synthetic lubricants, or as suitable wear additives for blending with mineral oil base stocks for lubricating purposes.

When utilized in mineral oil lubricating compositions to provide improved wear characteristics for the blend these compounds will generally be present in a concentration of from about 0.5% to about 5.0% by weight.

It will be apparent that certain modifications and changes may be made to this invention without departing from the scope hereof. Only such limitations should be imposed on this invention as are required by the claims appended hereto.

We claim:

1. As a new composition of matter, a compound having the formula:

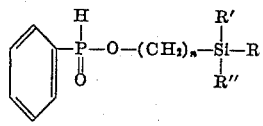

wherein $n$ is an integer from 3 to 8, and R, R′, R″ are alkyl groups having from 1 to 6 carbon atoms.

2. The compound benzene 4-trimethyl, silylbutyl-1, desoxyphosphonate.

3. The compound benzene 3-trimethyl, silylpropyl-1, desoxyphosphonate.

4. The compound benzene 4-ethyl, 4,4-dimethyl, silylbutyl-1, desoxyphosphonate.

5. The compound benzene 3-ethyl, 3,3-dimethyl-silylpropyl-1, desoxyphosphonate.

6. The compound benzene 6-trimethyl, silylhexyl-1, desoxyphosphonate.

References Cited in the file of this patent

UNITED STATES PATENTS 2,768,193    Gilbert ---------------- Oct. 23, 1956

UNITED STATES PATENT OFFICE
Certificate of Correction

Patent No. 2,864,845                        December 16, 1958

Paul M. Kerschner et al.

It is hereby certified that error appears in the printed specification of the above numbered patent requiring correction and that the said Letters Patent should read as corrected below.

Column 1, lines 33 to 37, the formula should appear as shown below instead of as in the patent—

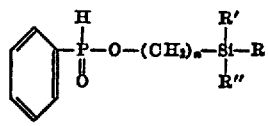

column 2, line 30, for "22.578" read —22,578—.

Signed and sealed this 14th day of April 1959.

[SEAL]

Attest:
KARL H. AXLINE,
*Attesting Officer.*

ROBERT C. WATSON,
*Commissioner of Patents.*